(12) United States Patent
Maruyama

(10) Patent No.: US 7,568,292 B2
(45) Date of Patent: Aug. 4, 2009

(54) LEVEL

(75) Inventor: Kiyoshi Maruyama, Tsubame (JP)

(73) Assignee: Ebisu Co., Ltd., Niigata (JP)

( * ) Notice: Subject to any disclaimer, the term of this patent is extended or adjusted under 35 U.S.C. 154(b) by 109 days.

(21) Appl. No.: 11/912,974

(22) PCT Filed: Sep. 21, 2005

(86) PCT No.: PCT/JP2005/017392

§ 371 (c)(1),
(2), (4) Date: Oct. 29, 2007

(87) PCT Pub. No.: WO2007/010631

PCT Pub. Date: Jan. 25, 2007

(65) Prior Publication Data

US 2009/0071023 A1   Mar. 19, 2009

(30) Foreign Application Priority Data

Jul. 20, 2005   (JP) ............................. 2005-210522

(51) Int. Cl.
*G01C 9/28* (2006.01)
(52) U.S. Cl. ......................................... 33/385; 33/379
(58) Field of Classification Search ................... 33/379, 33/380, 381, 383, 384, 385, 386, 387
See application file for complete search history.

(56) References Cited

U.S. PATENT DOCUMENTS

| 1,141,617 | A | * | 6/1915 | Creamer | 33/387 |
| 2,102,364 | A | * | 12/1937 | Langsner | 33/385 |
| 5,111,589 | A | * | 5/1992 | Tate | 33/385 |
| 5,506,759 | A | * | 4/1996 | Shirai et al. | 33/385 |
| 6,968,626 | B1 | * | 11/2005 | Wondracek | 33/379 |
| 2005/0160610 | A1 | * | 7/2005 | Scheyer | 33/379 |

FOREIGN PATENT DOCUMENTS

| JP | 11-512821 A | 11/1999 |
| JP | 2001-343236 A | 12/2001 |
| JP | 2002-39752 A | 2/2002 |

OTHER PUBLICATIONS

Japanese Office Action dated Oct. 2, 2008 (2 pages).

* cited by examiner

*Primary Examiner*—G. Bradley Bennett
(74) *Attorney, Agent, or Firm*—Sughrue Mion, PLLC

(57) ABSTRACT

A level being one in which a mounting base 2 is configured so that a first unit 2A that presses against the inner surface of one side of the container case 3 and a second unit 2B that presses against the inner surface of the opposing opposite side of the container case 3 are slidably assembled by way of a slide mechanism S; the slide mechanism S is formed so that the assembly contact surfaces 5 and 6 of the first unit 2A and second unit 2B are formed as slope guide surfaces 5 and 6; the slope guide surfaces 5 and 6 make contact with each other, the second unit 2B is slidably configured in the slope direction in relation to the first unit 2A.

8 Claims, 7 Drawing Sheets

LEVEL

TECHNICAL FIELD

The present invention relates to a level in which a bubble tube measuring portion having a bubble and liquid sealed therein is disposed in a container case, and which measures the levelness or perpendicularity of a measuring plane using the bubble tube measuring portion.

BACKGROUND ART

In this type of level, the configuration generally has a mounting base provided with a bubble tube measuring portion disposed inside a container case, and the mounting base is fixed in a prescribed position that allows the bubble tube measuring portion to be observed from a window hole provided in the container case.

In a level provided with a magnetic body, the configuration generally has a mounting base provided with a magnetic body disposed in a container case, and the mounting base is fixed to a prescribed position in which the magnetic body is exposed through an exposure hole provided in the container case.

In this manner, various conventional methods have proposed in which a mounting base provided with a bubble tube measuring portion or mounting base provided with a magnetic body is fixed to a prescribed position inside a container case, and there are configurations in which the mounting base is disposed inside the container case, and the mounting base is pressure welded and fixed inside the container case by pressure welding the end portion of the mounting base to the inner surface of the container case.

DISCLOSURE OF THE INVENTION

Problems the Invention is to Solve

An object of the present invention is to provide a novel level in which the mounting base is configured so that the first unit and the second unit are slidably assembled by way of a slide mechanism, and the second unit slides with respect to the first unit, whereby the entire length of the mounting base is variably configured; the mounting base is disposed inside a container case, and the second unit performs a sliding micromotion in relation to the first unit via pressing means that presses the second unit against the first unit of the mounting base, whereby the entire length of the mounting base is caused to perform a micromotion; and the opposing end portion of the mounting base is pressed to the inner surface of the container case, whereby the mounting base can be pressingly fixed inside the container case, and the mounting base can reliably be fixed inside the container case via an easy operation in a simple configuration.

Means for Solving the Problems

The main points of the present invention are described below with reference to the attached drawings.

The first aspect of the present invention relates to a level in which a mounting base 2 provided with a bubble tube measuring portion 1 in which a liquid and a bubble are sealed, or a mounting base 2 provided with a magnetic body 10, is disposed inside a container case 3; and an opposing end portion 2a of the mounting base 2 is pressed to the inner surface of the container case 3 to obtain a structure in which the mounting base 2 is pressingly fixed inside the container case 3 in a prescribed position in which the bubble tube measuring portion 1 can be viewed from a window hole 4 provided to the container case 3, or in a prescribed location that allows the magnetic body 10 to be exposed from an exposure hole 14 provided to the container case 3; wherein the mounting base 2 is configured so that a first unit 2A that presses against the inner surface of one side of the container case 3 and a second unit 2B that presses against the inner surface of the opposing opposite side of the container case 3 are slidably assembled by way of a slide mechanism S; the slide mechanism S is formed so that assembly contact surfaces 5 and 6 of the first unit 2A and second unit 2B are formed as slope guide surfaces 5 and 6; the slope guide surfaces 5 and 6 make contact with each other, the second unit 2B is slidably configured in the slope direction in relation to the first unit 2A, and the entire length of the mounting base 2 composed of the first unit 2A and second unit 2B is variably configured; and the entire length of the mounting base 2 performs a micromotion when the second unit 2B performs a sliding micromotion in relation to the first unit 2A via pressing means P that presses the second unit 2B against the first unit 2A of the mounting base 2 to obtain a structure in which the mounting base 2 can be pressingly fixed inside the container case 3.

The level according to the second aspect is the level according the first aspect, wherein the pressing means P is configured to press the second unit 2B against the first unit 2A of the mounting base 2 by the tightening and pressing of a tightening member 7, and to cause the second unit 2B to perform a sliding micromotion against the first unit 2A in the slope direction.

The level according to the third aspect is the level according the second aspect, wherein the pressing means P has a tightening screw 7 as the tightening member 7; the tightening screw 7 is provided in an inserted state in a unit selected from the first unit 2A and the second unit 2B of the mounting base 2 and is provided in a threaded state in the other unit; the first unit 2A or the second unit 2B in which the tightening screw 7 is provided in an inserted state is configured to perform a sliding micromotion in the slope direction against the tightening screw 7 and the second unit 2B or the first unit 2A in which the tightening screw 7 is provided in a threaded state; and a configuration is provided in which the tightening screw 7 is tightened and threadably moved, whereby the screw head 7a of the tightening screw 7 presses the second unit 2B against the first unit 2A, and the second unit 2B is caused to perform a sliding micromotion in the slope direction against the first unit 2A.

The level according to the fourth aspect is the level according the third aspect, wherein a threaded hole 9 is provided that allows the tightening screw 7 to be threaded into the slope guide surface 5 of the first unit 2A or the slope guide surface 6 of the second unit 2B of the mounting base 2; a screw through-hole 8 that allows the tightening screw 7 threaded into the threaded hole 9 to be inserted is provided to the slope guide surface 6 of the second unit 2B or to the slope guide surface 5 of the first unit 2A; and the screw through-hole 8 is formed in the shape of a long hole in the lengthwise direction of the mounting base 2.

The level according to the fifth aspect is the level according the third or fourth aspect, wherein the mounting base 2 is configured to be inserted from the end portion opening 3a of the container case 3 and disposed in the container case 3; and the tightening screw 7 is configured to be disposed in the mounting base 2 along an insertion direction into the container case 3 of the mounting base 2.

The level according to the sixth aspect is the level according the first through fourth aspects, wherein a configuration is provided in which the container case 3 has a positioning stopper 11 whereby the mounting base 2 disposed in the container case 3 is positioned and stopped in a prescribed location; and the opposing end portion 2a of the mounting base 2 is pressed to the inner surface of the container case 3 in a stopped state at the positioning stopper 11, whereby the mounting base 2 is configured so as to be pressingly fixed in a positioned and stopped state inside the container case 3.

The level according to the seventh aspect is the level according the fifth aspect, wherein a configuration is provided in which the container case 3 has a positioning stopper 11 whereby the mounting base 2 disposed in the container case 3 is positioned and stopped in a prescribed location; and the opposing end portion 2a of the mounting base 2 is pressed to the inner surface of the container case 3 in a stopped state at the positioning stopper 11, whereby the mounting base 2 is pressingly fixed in a positioned and stopped state inside the container case 3.

The level according to the eighth aspect is the level according the sixth aspect, wherein a configuration is provided in which the positioning stopper 11 is used as a notch portion 12 formed in the container case 3; and an end portion 2a of the mounting base 2 is formed in a somewhat protruding state to allow the opposing end portion 2a of the mounting base 2 to be pressed to the inner surface of the container case 3 in a state in which the end portion 2a of the mounting base 2 is locked and stopped in the notch portion 12, whereby the mounting base 2 is configured so as to be pressingly fixed in a positioned and stopped state inside the container case 3.

Effect of the Invention

The configuration of the present invention described above is one in which a mounting base provided with a bubble measuring portion or a mounting base provided with a magnetic body is constituted by a first unit and a second unit assembled via a slide mechanism; slope guide surfaces, which are the assembly contact surfaces of the first unit and second unit, are brought into contact with each other, and the second unit is slidably configured in the slope direction in relation to the first unit; the entire length of the mounting base composed of the first unit and the second unit is variably configured; and the entire length of the mounting base is variably adjusted by the pressing means, whereby the opposing end portion of the mounting base is pressed to the inner surface of the container case to cause the mounting base to be pressingly fixed in the container case.

The pressing means can be configured to be capable of pressing the second unit against the first unit of the mounting base in a simple manner. Therefore, a configuration in which the second unit can be pressed against the first unit of the mounting base in a simple operation can be achieved in a simple manner by using a simple configuration in which the second unit is pressed against the first unit by the tightening and pressing of a tightening screw. Hence, a configuration can be achieved in which the entire length of the mounting base can be caused to perform a micromotion in a simple manner using a simple configuration.

The present invention allows a mounting base to be reliably pressingly fixed inside a container case with a simple operation while having a simple configuration, and an excellent level that has few components can be obtained having excellent features in terms of productivity and cost.

In the second aspect of the present invention the mounting base is disposed inside the container case, the second unit can be securely pressed against the first unit of the mounting base in a very simple operation by merely tightening and threading a tightening member, and a very practical level can therefore be obtained in which the mounting base can be pressingly fixed inside the container case in a simple and reliable manner.

In the third and fourth aspects of the present invention, a configuration in which the second unit can be pressed against the first unit of the mounting base can be achieved by merely tightening and threading the tightening member provided to the mounting base, and a very practical level can be obtained in which the present invention is achieved in a simpler manner.

In the fifth aspect of the present invention, the mounting base can be inserted inside the container case in a simple manner. A screwdriver or another tool for threadably moving a screw is inserted from the end portion opening of the container case in which the mounting base has been inserted, and the tightening screw provided to the mounting base disposed in the container case can be tightened in a simple operation. An even more practical level can be obtained without compromising the external appearance or otherwise producing unwanted effects because the tightening screw is disposed in a space within the container case.

In the sixth and seventh aspects of the present invention, the mounting base is not pressingly fixed inside the container case by merely pressing the opposing end portion of the mounting base to the inner surface of the container case, but rather the opposing end portion of the mounting base is pressed to the inner surface of the container case in a state in which the mounting base is stopped at a positioning stopper formed in the container case. The mounting base can thereby be pressingly fixed in a positioned state, and a practical level can be obtained that allows the mounting base to be pressingly fixed in a more reliable manner with good precision in a prescribed position in the container case.

In the eighth aspect of the present invention, the mounting base is, for example, inserted from the end portion opening of the container case and is moved inward into the container case, and the opposing end portion of the mounting base is pressed to the inner surface of the container case by the pressing means at a location at which the end portion of the mounting base in a slightly protruding state has dropped into a notch formed in the container case. The mounting base can thereby be pressingly fixed in a simple manner while placed in a prescribed position inside the container case, and a very practical level can be conveniently obtained so that the mounting base is pressingly fixed in a reliable manner in a prescribed position.

[KEY]

Figure 1:
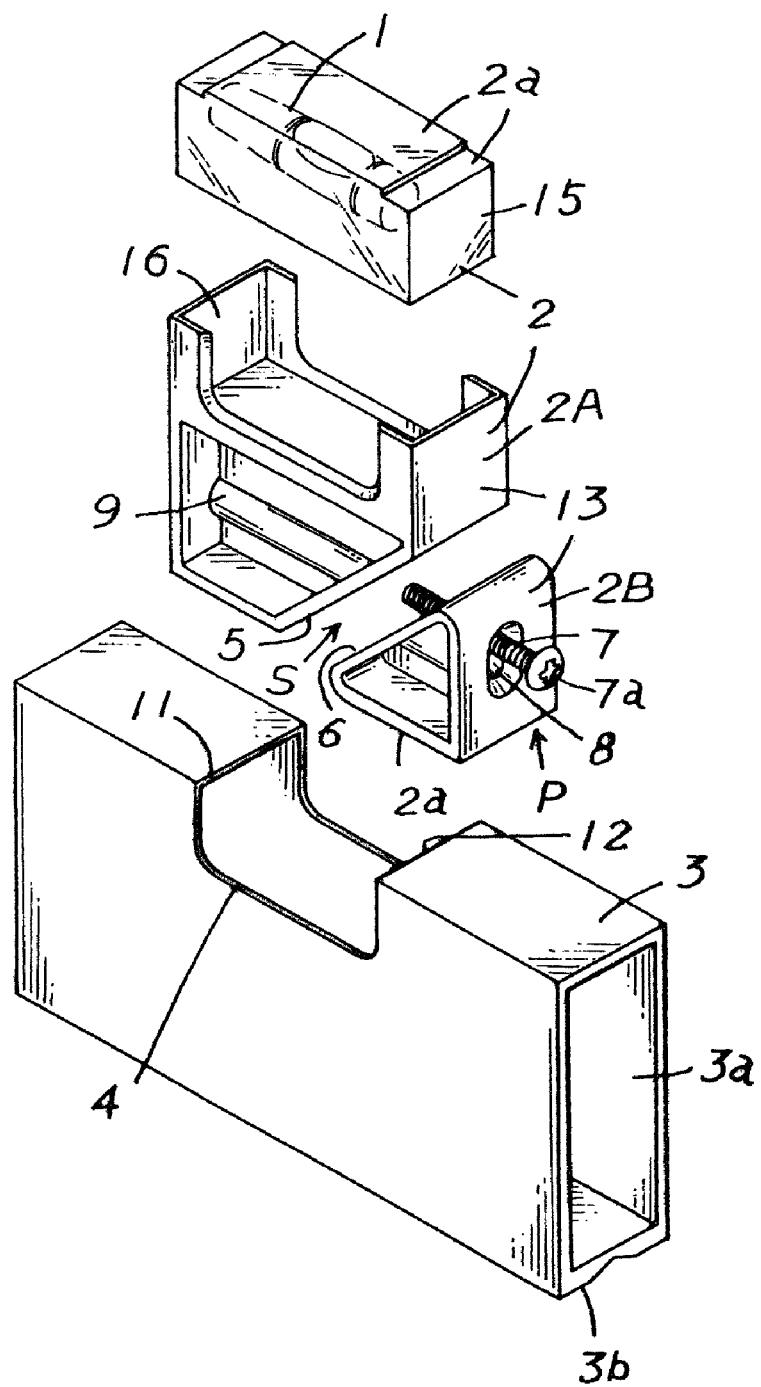
FIG. 1 is an exploded perspective view of the level according to the present example.

1 Bubble tube measuring portion
2 Mounting base
2A First unit
2B Second unit
2 End portion
3 Container case
3a End portion opening 3a
4 Window hole
5 Assembly contact surface, slope guide surface
6 Assembly contact surface, slope guide surface
7 Tightening member, tightening screw
7a Screw head
8 Threaded through-hole
9 Threaded hole
10 Magnetic body
11 Positioning stopper
12 Notch
14 Exposure hole
P Pressing means
S Slide mechanism

BEST MODE FOR CARRYING OUT THE INVENTION

Preferred embodiments (the manner in which the present invention is implemented) of the present invention are briefly described below with reference to the diagrams while indicating the effects of the present invention.

A mounting base 2 provided with a bubble tube measuring portion 1 in which a liquid and a bubble are sealed, or a mounting base 2 provided with a magnetic body 10, is disposed inside a container case 3; and the mounting base 2 is disposed in a prescribed position in which the bubble tube measuring portion 1 can be viewed from a window hole 4 provided to the container case 3, or in a prescribed location that allows the magnetic body 10 to be exposed from an exposure hole 14 provided to the container case 3.

The mounting base 2 is composed of a first unit 2A and a second unit 2B that are slidably assembled via a slide mechanism S, the assembly contact surfaces 5 and 6 of the first unit 2A and second unit 2B are formed as slope guide surfaces 5 and 6, the slope guide surfaces 5 and 6 make contact with each other, and the second unit 2B slides in the slope direction in relation to the first unit 2A, whereby the entire length of the mounting base 2 composed of the first unit 2A and second unit 2B is variably disposed.

With the mounting base 2 disposed inside the container case 3, the entire length of the mounting base 2 performs a micromotion when the second unit 2B performs a sliding micromotion along the slope guide surfaced 5 and 6 in relation to the first unit 2A when the second unit 2B is pressed against the first unit 2A of the mounting base 2 by using pressing means P. Therefore, the entire length of the mounting base 2 is caused to perform a micromotion so that the entire length of the mounting base 2 is increased, whereby the first unit 2A of the mounting base 2 can be pressed to the inner surface of one side of the container case 3, the second unit 2B can be pressed to the inner surface of the opposing opposite side of the container case 3 to cause the mounting base 2 composed of the first unit 2A and second unit 2B to be pressingly fixed inside the container case 3.

In other words, the pressing of the pressing means P can be applied over the entire length of the mounting base 2 via the slide mechanism S, the opposing end portion 2a in the entire length direction of the mounting base 2 can be pressed against the container case 3 by the pressing of the pressing means P to cause the mounting base 2 to be pressingly fixed inside the container case 3.

Therefore, the first unit 2A and second unit 2B of the mounting base 2 are set in a free state (the entire length of the mounting base 2 is in a length-variable state) by releasing the pressing of the pressing means P, whereby the mounting base 2 can be smoothly disposed inside the container case 3 without having the mounting base 2 press against the container case 3 to cause the mounting base 2 disposed in the container case 3 to be pressingly fixed inside the container case 3 in a simple manner when the pressing means P presses the second unit 2B against the first unit 2A.

For this reason, the present invention is configured so that the second unit 2B is tightened and pressed against the first unit 2A by tightening, e.g., a screw, a bolt and nut, or another tightening screw 7, and the mounting base 2 can therefore be reliably pressingly fixed inside the container case 3 in a simple manner by threadably tightening a single screw, a bolt and nut pair, or another tightening screw 7.

For example, a tightening screw 7 is adopted in the pressing means P as the tightening member 7; the tightening screw 7 is provided in an inserted state in a unit selected from the first unit 2A and the second unit 2B of the mounting base 2 and is provided in a threaded state in the other unit; the first unit 2A or the second unit 2B in which the tightening screw 7 is provided in an inserted state is configured to perform a sliding micromotion in the slope direction against the tightening screw 7 and the second unit 2B or the first unit 2A in which the tightening screw 7 is provided in a threaded state; and the tightening screw 7 is tightened and threadably moved, whereby the screw head 7a of the tightening screw 7 presses the second unit 2B against the first unit 2A, and the second unit 2B is configured to perform a sliding micromotion in the slope direction against the first unit 2A. In such a configuration, for example, when the tightening screw 7 provided in a threaded state into the first unit 2A or the second unit 2B of the mounting base 2 is tightened and threadably operated, the screw head 7a of the tightening screw 7 is moved into proximity of the first unit 2A. Therefore, the first unit 2A or second unit 2B disposed between the screw head 7a and the second unit 2B or the first unit 2A is tightened and pressed by the tightening screw 7, and the second unit 2B is thereby tightened and pressed by the tightening screw 7 against the first unit 2A, and the second unit 2B is caused to perform a sliding micromotion in the slope direction against the first unit 2A.

In other words, the mounting base 2 is disposed inside the container case 3, the entire length of the mounting base 2 is caused to perform a micromotion and adjusted with a very simple operation in which the tightening member 7 is merely tightened and threadably moved, the opposing end portion 2a in the lengthwise direction of the mounting base 2 can be pressingly fixed to the inner surface of the container case 3 in a reliable manner, and the mounting base 2 can be pressingly fixed inside the container case 3.

Therefore, a configuration in which the second unit 2B can be pressed against the first unit 2A of the mounting base 2 can be achieved in a simple manner by merely tightening and threadably moving the tightening member 7 provided to the mounting base 2, and the present invention can be easily realized.

Additionally, for example, the mounting base 2 is configured to be insertably disposed inside the container case 3 from the end portion opening 3a of the container case 3, and the tightening screw 7 is configured to be provided to the mounting base 2 along the insertion direction into the container case 3 of the mounting base 2, whereby the tightening screw 7 provided to the mounting base 2 inserted from the end portion opening 3a of the container case 3 is configured so that a screwdriver inserted from the end portion opening 3a of the container case 3 can perform a tightening and threadable movement operation, a configuration capable of pressingly fixing the mounting base 2 inside the container case 3 in a more simple manner can be easily achieved, and since the tightening screw 7 can be disposed inside the container case 3, the tightening screw 7 as such is protected from external impacts, screw-loosening is reduced without concern for compromising the external appearance, and an improved configured is achieved.

For example, a positioning stopper 11 may be provided in the container case 3 to position and stop the mounting base 2 disposed inside the container case 3 in a prescribed position, and the opposing end portion 2a of the mounting base 2 may be pressed to the inner surface of the container case 3 in a stopped state with the aid of the positioning stopper 11, whereby the mounting base 2 is configured to be pressingly fixed in a positioned and stopped state inside the container case 3. In such a case, the opposing end portion 2a of the mounting base 2 is not only merely pressed to the inner surface of the container case 3, but the opposing end portion 2a of the mounting base 2 is also pressed to the inner surface of the container case 3 in a stopped state with the aid of the positioning stopper 11, whereby the mounting base 2 can be pressingly fixed in a prescribed position inside the container case 3 in a more reliable manner.

For example, the positioning stopper 11 may be used as a notch portion 12 formed in the container case 3, an end portion 2a of the mounting base 2 may be formed in a somewhat protruding state, and the opposing end portion 2a of the mounting base 2 may be pressed to the inner surface of the container case 3 in a state in which the end portion 2a of the mounting base 2 is locked and stopped in the notch portion 12, whereby the mounting base 2 is configured so as to be pressingly fixed in a positioned and stopped state inside the container case 3. In such a case, for example, the mounting base 2 is inserted into the container case 3 from the end portion opening 3a of the container case 3, the mounting base 2 is inserted to the position where the end portion 2a formed on the mounting base 2 in a somewhat projecting state drops into the notch portion 12 provided in the container case 3, and, in this position, the mounting base 2 can be pressingly fixed in a very smooth and reliable manner in a positioned state in a prescribed position of the container case 3 with a simple operation in which the opposing end portion 2a of the mounting base 2 is merely pressed to the inner surface of the container case 3 with the aid of the pressing means P.

Therefore, the present invention is an excellent level in which the mounting base 2 can be pressingly fixed in a reliable manner inside the container case 3 with a simple operation while using a simple configuration, and that has few components can be obtained having excellent features in terms of productivity and cost.

EXAMPLES

Specific examples of the present invention are described below with reference to the diagrams.

The present example is a level wherein a mounting base 2 provided with a bubble tube measuring portion 1 in which a liquid and a bubble are sealed is disposed inside a container case 3, and wherein an opposing end portion 2a of the mounting base 2 is pressed to the inner surface of the container case 3 to pressingly fix the mounting base 2 inside the container case 3 in a prescribed position in which the bubble tube measuring portion 1 can be viewed from a window hole 4 provided to the container case 3.

The mounting base 2 is composed of a first unit 2A that presses against the inner surface of one side of the container case 3 and a second unit 2B that presses against the inner surface of the opposing opposite side of the container case 3, and these units are slidably assembled by way of a slide mechanism S. The slide mechanism S is formed so that the first and second assembly contact surfaces 5 and 6 of the first unit 2A and second unit 2B are formed as slope guide surfaces 5 and 6. The slope guide surfaces 5 and 6 make contact with each other, the second unit 2B is slidably configured in the slope direction in relation to the first unit 2A, and the entire length of the mounting base 2 composed of the first unit 2A and second unit 2B is variably configured.

Specifically, the first unit 2A of the mounting base 2 is formed into a shape having a slope guide surface 5 that slopes upward from a substantially center position of a front-view square-shaped bottom toward a position having a prescribed height (substantially center height position) on the side portion, as shown in FIG. 1, and the second unit 2B is formed into a plan-view triangular shape having a slope guide surface 6 in the upward direction.

Figure 3:
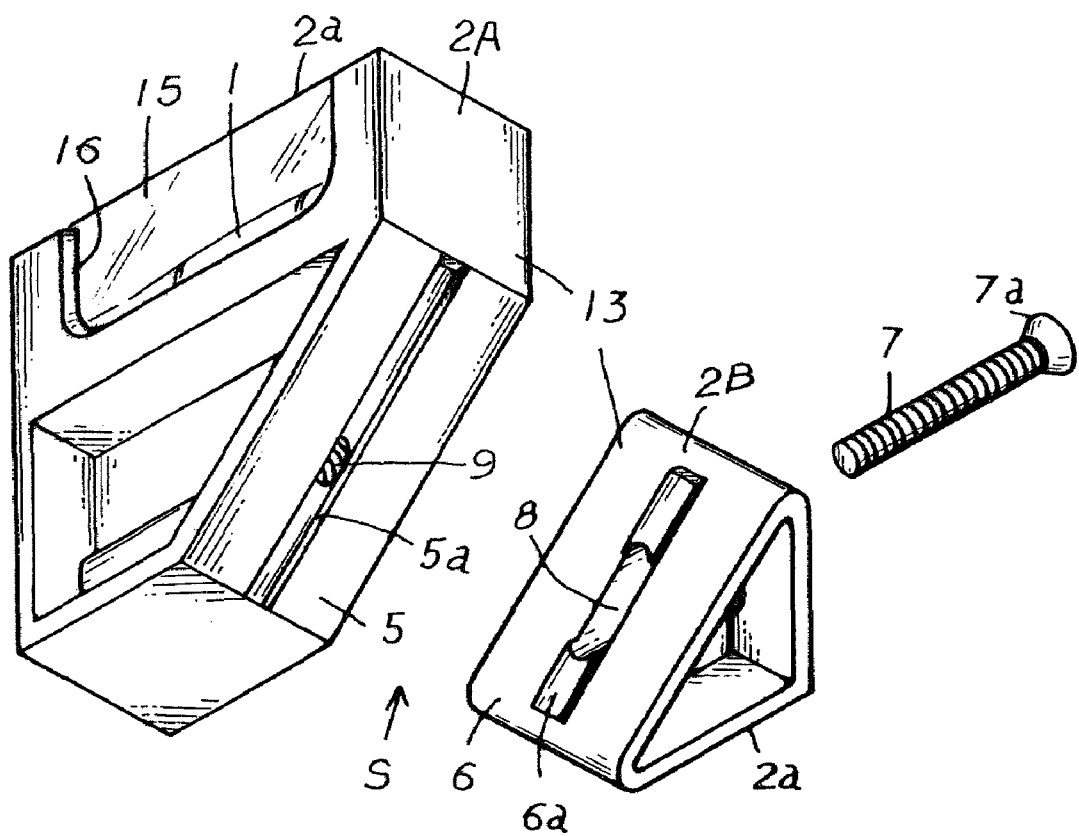
FIG. 3 is a descriptive perspective view of the mounting base 2 of the level of the present example.

A slide guide groove 5a is formed in the slope guide surface 5 of the first unit 2A of the mounting base 2 along the slope guide surface 5, and a locking raised strip 6a that locks into the slide guide groove 5a of the first unit 2A is formed in the slope guide surface 6 of the second unit 2B, as shown in FIG. 3. A configuration is provided in which the slope guide surface 5 of the first unit 2A and the slope guide surface 6 of the second unit 2B are assembled and brought into contact with each other so that the slide guide groove 5a and the locking raised strip 6a lock together, whereby the second unit 2B reliably slides in the slope direction of the slope guide surfaces 5 and 6 against the first unit 2A.

In the present example, pressing means P is provided for pressing the second unit 2B against the first unit 2A of the mounting base 2.

The pressing means P is configured so as to press the second unit 2B against the first unit 2A of the mounting base 2 by way of the tightening pressing of a screw, bolt and nut, or another the tightening member 7.

Therefore, the second unit 2B can easily be pressed against the first unit 2A of the mounting base 2 with a simple operation in which the tightening member 7 is merely tightened and threadably moved.

In the present example, a tightening screw 7 is adopted as the tightening member 7. The tightening screw 7 is inserted into one unit selected from the first unit 2A and the second unit 2B of the mounting base 2, is threaded into the other unit, and is configured to be capable of pressing the first unit 2A or the second unit 2B in which the tightening screw 7 is insertably disposed by using the screw head 7a of the tightening screw 7. The first unit 2A or second unit 2B in which the tightening screw 7 is insertably disposed is configured to be able to move in the lengthwise direction of the mounting base 2 in relation to the tightening screw 7, and the second unit 2B is configured to be capable of performing a sliding micromotion against the second unit 2B by way of the tightening and pressing of the tightening screw 7.

Figure 5:
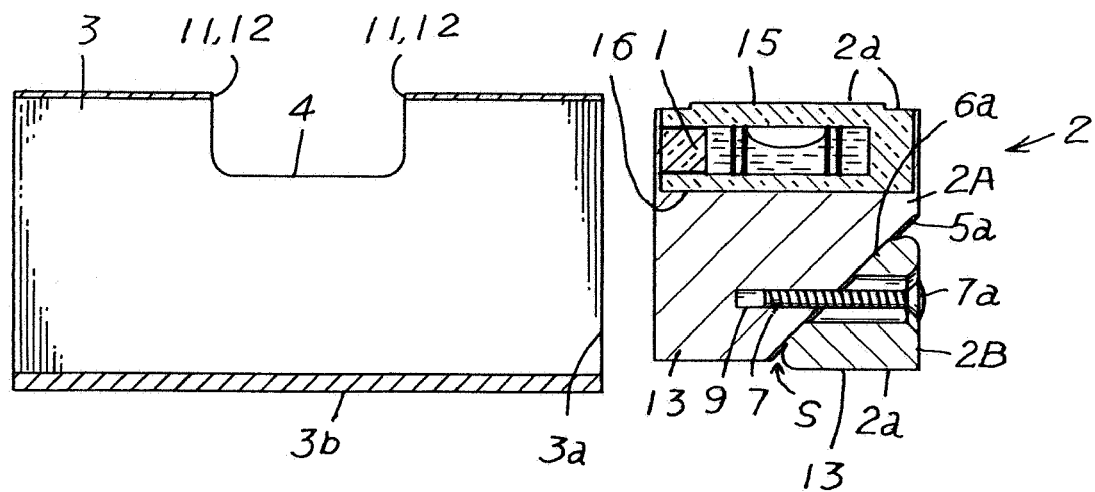
FIG. 5 is a descriptive plane sectional view of the present example.

The tightening screw 7 may be insertably disposed in the first unit 2A or the second unit 2B, and may be threadably disposed in either unit, but in the present example, a threaded hole 9 in which the tightening screw 7 can be threaded is provided to the slope guide surface 5 of the first unit 2A or slope guide surface 6 of the second unit 2B of the mounting base 2, and a screw through-hole 8 in which the tightening screw 7 threaded into the threaded hole 9 can be inserted is provided to the slope guide surface 5 of the first unit 2A or to the slope guide surface 6 of the second unit 2B, as shown in FIG. 3. The screw through-hole 8 is formed in the shape of a long hole in the lengthwise direction of the mounting base 2, as shown in FIGS. 1 and 5. The tightening screw 7 is insertably disposed in a freely fitted state in the lengthwise direction of the mounting base 2 in relation to the screw through-hole 8 of the second unit 2B, and the internal space of the screw through-hole 8 is formed in the shape that narrows in the upward direction as viewed from the front, as shown in FIG. 5.

Therefore, the pressing means P tends to perform a micromotion in the direction in which the screw head 7a approaches in relation to the slope guide surface 5 of the first unit 2A when the tightening screw 7 threaded into the threaded hole 9 of the first unit 2A is tightened and threadably moved. The second unit 2B disposed between the screw head 7a and the slope guide surface 5 of the first unit 2A is pressed in the direction in which the space inside the screw through-hole 8 of the second unit 2B narrows (the direction in which the second unit 2B relatively moves downward in relation to the tightening screw 7) so as to allow a micromotion to be made against the slope guide surface 5 of the first unit 2A in the direction in which the screw head 7a approaches. Therefore, the second unit 2B of the mounting base 2 performs a sliding micromotion in the downward slope direction in relation to the first unit 2A and performs a micromotion in the direction in which the entire length of the mounting base 2 extends, whereby the tightening screw 7 of the pressing means P is tightened and threadably operated.

The mounting base 2 is configured to be insertably disposed inside the container case 3 from the end portion opening 3a of the container case 3, and the threaded hole 9 disposed in the first unit 2A of the mounting base 2 is formed so as to allow the tightening screw 7 to be threaded from the slope guide surface 5 of the first unit 2A along the insertion direction into the container case 3 of the mounting base 2, so that the tightening screw 7 is disposed in the mounting base 2 along the insertion direction into the container case 3 of the mounting base 2.

Figure 2:
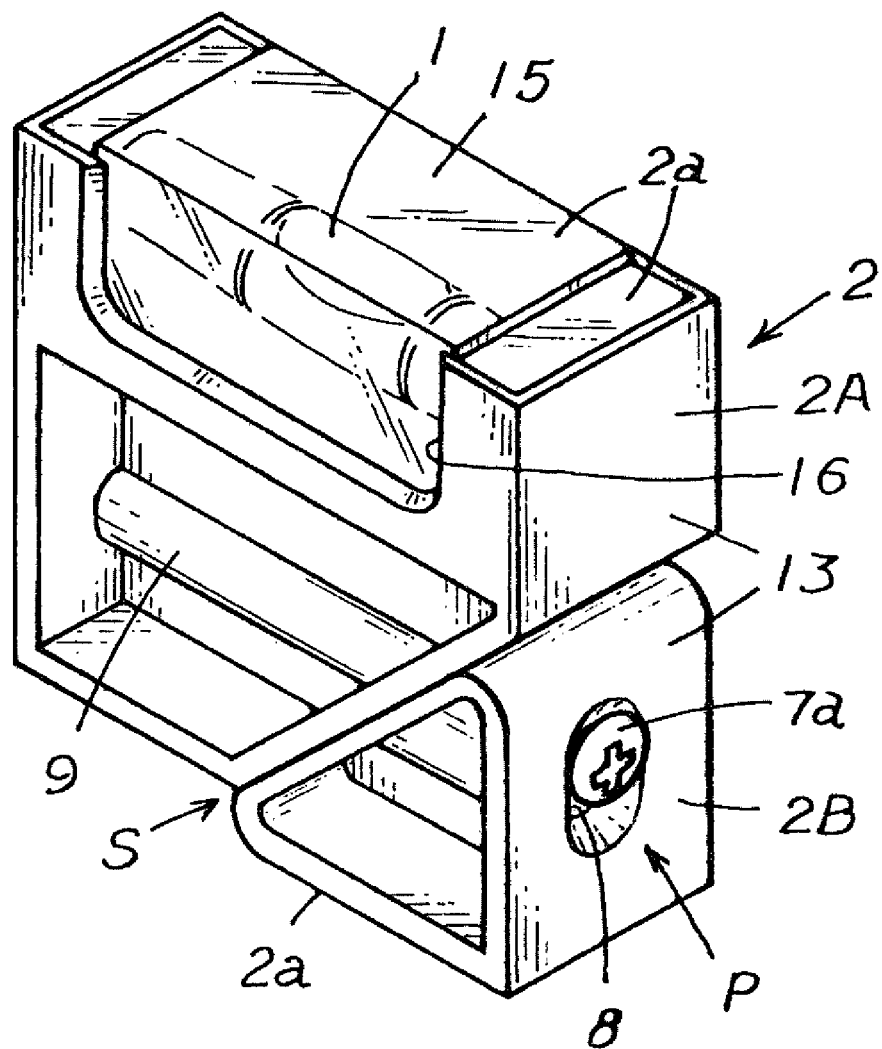
FIG. 2 is a descriptive perspective view of the mounting base 2 of the level of the present example.

Therefore, the mounting base 2 is configured such that the positions of the threaded hole 9 of the first unit 2A and the screw through-hole 8 of the second unit 2B are aligned, as shown in FIG. 2, the tightening screw 7 is inserted from the screw through-hole 8 and threaded into the threaded hole 9, and the first unit 2A and second unit 2B are assembled. In this state, the mounting base 2 is inserted from the side direction into the container case 3 from the end portion opening 3a of the container case 3, and a screwdriver or the like can be inserted from the end portion opening 3a of the container case 3 to threadably operate the tightening screw 7 provided to the mounting base 2. Since the tightening screw 7 is positioned inside the container case 3, it is visually apparent that the space inside the container case 3 can be effectively used.

The pressing means P is not limited to the configuration of the present example in which the first unit 2A and second unit 2B are tightened by a tightening screw 7, and another configuration can be used as long as the same effect of the present example is demonstrated.

The mounting base 2 may, specifically, have a bubble tube measuring portion 1 provided to the first unit 2A or the second unit 2B, but in the present example, the bubble tube measuring portion is provided to the upper portion of the first unit 2A. Specifically, the mounting base 2 is composed of a bubble tube measuring device 15 in which the bubble tube measuring portion 1 is embedded, and a mounting member 13 in which the bubble tube measuring device 15 composed of the first unit 2A and second unit 2B can be mounted. An inset concavity 16 that allows the bubble tube measuring device 15 to be inset is provided in the upper portion of the first unit 2A constituting the mounting member 13, and the mounting base 2 composed of the bubble tube measuring device 15 and the mounting member 13 is, as shown in FIG. 2, configured such that the upper surface of the bubble tube measuring device 15 mounted in the upper portion of the first unit 2A constituting the mounting member 13 acts as one end portion 2a of the mounting base 2, the lower surface of the second unit 2B constituting the mounting member 13 acts as the other end portion 2a of the mounting base 2, and the opposing end portion 2a of the mounting base 2 makes surface contact with the inner surface of the container case 3. The mounting base 2 in a state in which the bubble tube measuring device 15 is fitted into the inset concavity 16 of the upper portion of the mounting member 13 is disposed inside the container case 3, and the opposing end portion 2a of the mounting base 2, i.e., the upper surface of the bubble tube measuring device 15 and the lower surface of the second unit 2B are pressed to the inner surface of the container case 3, whereby the mounting base 2 is pressingly fixed inside the container case 3 and the bubble tube measuring device 15 is retainably fitted into the inset concavity 16.

In the bubble tube measuring device 15, a common configuration is adopted in which a transparent resin is embedded in the bubble tube measuring portion 1, and the second unit 2B and the first unit 2A composed of the mounting member 13 in which the bubble tube measuring device 15 is mounted are molded from resin, whereby the slope guide surfaces 5 and 6, the threaded hole 9, and the screw through-hole 8 are integrally formed, giving the mounting base 2 a configuration that is advantageous in terms of mass-productivity.

In the present example, the mounting member 13 of the mounting base 2 is composed of two separate members (first unit 2A and second unit 2B) that are assembled by way of a slide mechanism S, but the configuration may be one in which a third unit (not shown in the diagram) is mounted between the first unit 2A and second unit 2B by way of a slide mechanism S, resulting in three separate members (or a plurality of separate members greater than three) assembled by way of a slide mechanism.

Figure 4:
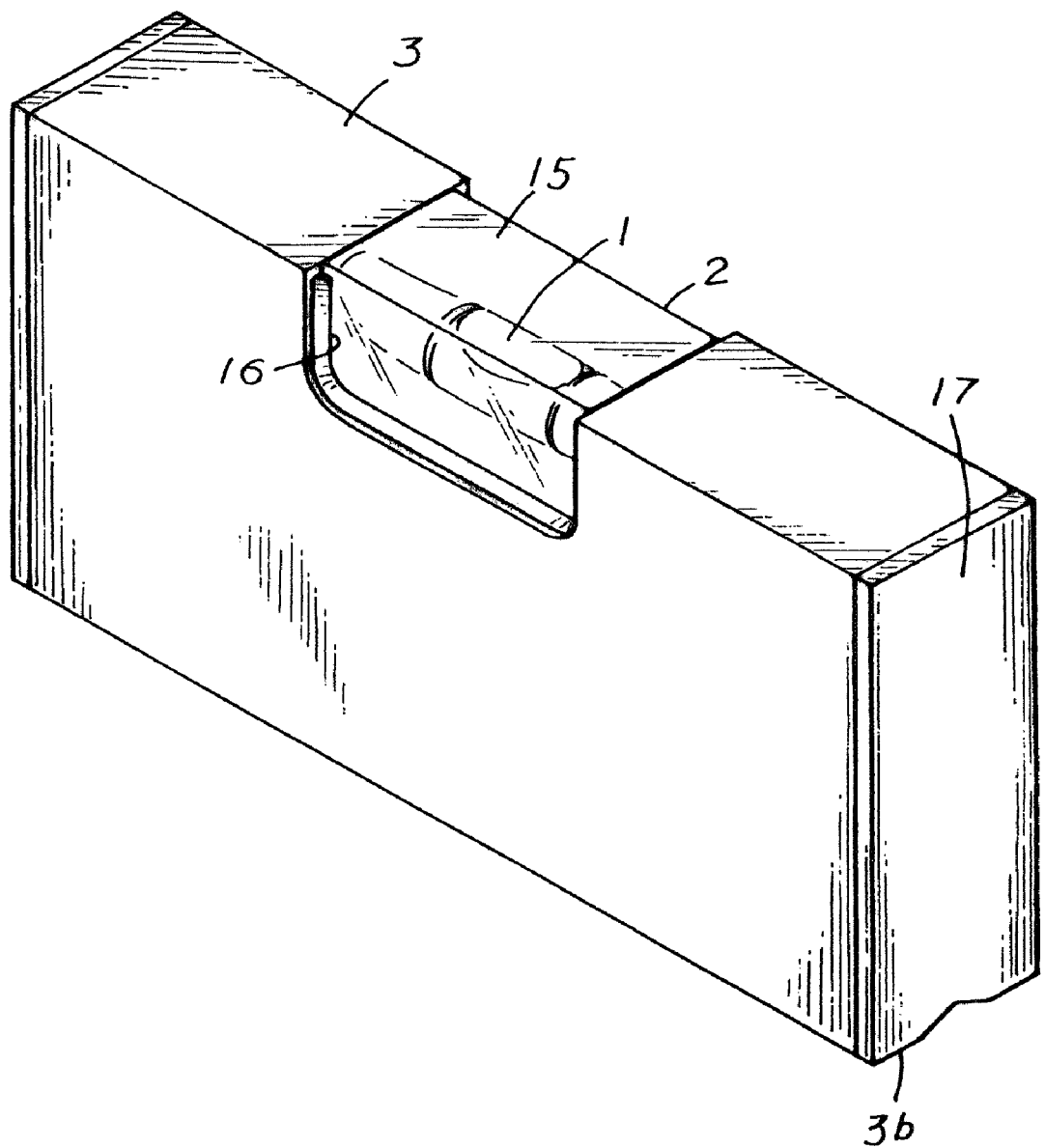
FIG. 4 is a perspective view showing the in-service state of the present example.

The container case 3 has a shape having an end portion opening 3a for insertably disposing the mounting base 2 inside the container case 3, as shown in FIG. 1. The mounting base 2 is insertably disposed from the end portion opening 3a of the container case 3, as shown in FIG. 4, and a cover 17 for covering the end portion opening 3a is detachably configured on the end portion opening 3a.

The upper portion of the container case 3 has a shape in which a window hole 4 is formed that allows the bubble tube measuring portion 1 of the mounting base 2 that has been pressingly fixed in prescribed position inside the container case 3 to be viewed.

A reference surface 3b (the lower surface in FIG. 1) has a shape in which the center area of the surface is recessed inward along the length direction of the container case 3 so that substantially the center area of a reference surface 3b that is to be placed on desired measurement object can also be well placed on a cylindrical measurement object. The inside lower surface of the container case 3 on the reverse surface of the container case 3 of the reference surface 3b is formed in a planar shape so as to be capable of good surface contact with the mounting base 2.

A positioning stopper 11 for positioning and stopping the mounting base 2 is disposed in the container case 3 in a prescribed position in the container case 3, and the mounting base 2 is configured so as to be pressingly fixed in a positioned and stopped state inside the container case 3 by pressing the opposing end portion 2a of the mounting base 2 to the inner surface of the container case 3 in a stopped state on the positioning stopper 11.

The positioning stopper 11 is used as the notch portion 12 formed in the container case 3. The end portion 2a of the mounting base 2 is formed in a somewhat protruding state, and the opposing end portion 2a of the mounting base 2 is pressed to the inner surface of the container case 3 in a state in which the end portion 2a of the mounting base 2 is locked and stopped in the notch portion 12, whereby the mounting base 2 is configured so as to be pressingly fixed in a positioned and stopped state inside the container case 3.

Specifically, the center area of the upper surface of the bubble tube measuring device 15 at one end portion 2a of the mounting base 2 is formed in a somewhat upward protruding state, as shown in FIGS. 1 and 2, and the upper edge portion of the window hole 4 formed as a notch above the container case 3 is used as the notch portion 12. The mounting base 2 is pressingly fixed inside the container case 3 in a state in which one end (the upper surface of the bubble tube measuring device 15) of the somewhat protruding state of the mounting base 2 is in a locked and stopped state in the window hole 4 that acts as the notch portion 12, as shown in FIGS. 4 and 8, whereby the mounting base 2 is configured so as to be capable of being pressingly fixed inside the container case 3.

In the present example, the configuration described above allows the mounting member 13 composed of the first unit 2A and second unit 2B to be assembled via a tightening screw 7, the bubble tube measuring device 15 to be fitted into the inset concavity 16 provided in the upper portion of the first unit 2A of the mounting member 13, the mounting base 2 to be assembled in the manner shown in FIG. 2, and the mounting base 2 to be smoothly inserted from the end portion opening 3a of the container case 3 without being pressed into the container case 3, as shown in FIG. 5.

Figure 6:
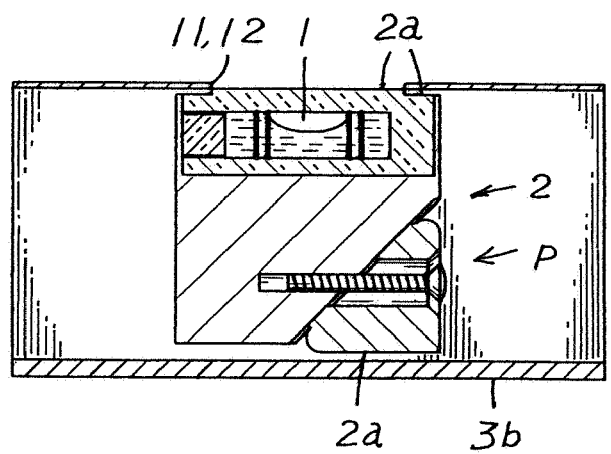
FIG. 6 is a descriptive plane sectional view of the present example.
Figure 7:
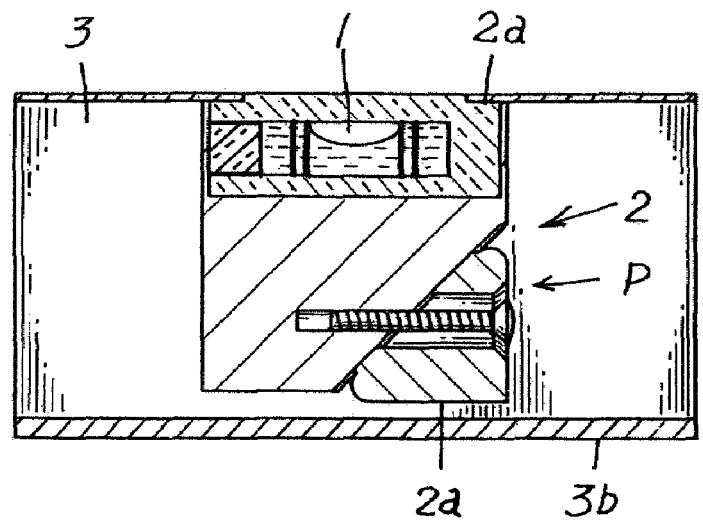
FIG. 7 is a descriptive plane sectional view of the present example.

The mounting base 2 inserted from the end portion opening 3a of the container case 3 is inserted deep into the container case 3 to the alignment position of the window hole 4 formed in the container case 3 and the upper surface of the somewhat protruding state of the bubble tube measuring device 15, which is one end portion 2a of the mounting base 2, as shown in FIG. 6, and the position of the mounting base 2 is aligned to a prescribed position in which one end portion 2a of the mounting base 2 is locked and stopped in the window hole 4 of the container case 3, as shown in FIG. 7. The method for aligning the mounting base 2 to a prescribed position of the container case 3 may, for example, be one in which the mounting base 2 is inserted into the container case 3, the container case 3 is then turned upside down and slidably inserted deep into the mounting base 2 to a position at which one end portion 2a of the mounting base 2 drops into the window hole of the container case 3, and alignment in a prescribed position can be carried out in a simple manner.

Figure 8:
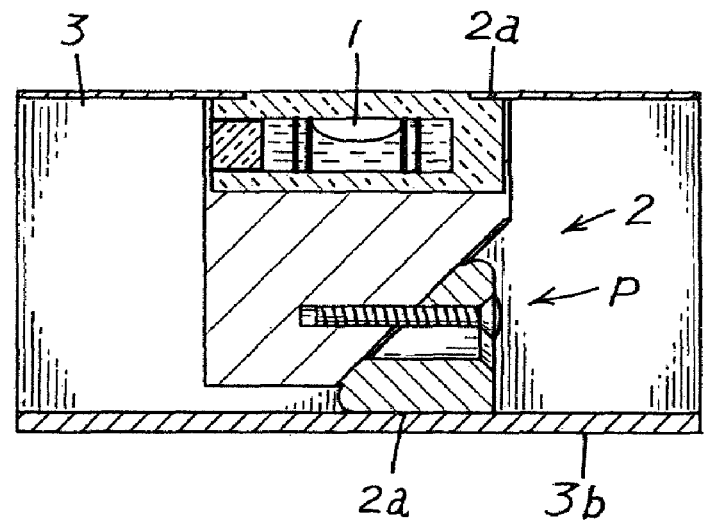
FIG. 8 is a descriptive plane sectional view of the present example.

In this manner, the tightening screw 7 threadably inserted into the mounting base 2 in the same manner shown in FIG. 8 is tightened in a state in which one end portion 2a of the mounting base 2 is locked and stopped in the window hole 4 of the 3, and the first unit 2A and second unit 2B perform a sliding micromotion in the lengthwise direction (the direction in which the opposing end portion 2a of the mounting base 2 is set at a distance) of the mounting base 2, whereby an excellent level that can be assembled with good work efficiency can be obtained in which the opposing end portion 2a of the mounting base 2 is pressed to the surface of the container case 3, the mounting base 2 can be pressingly fixed in a reliable manner in a prescribed position (precisely a position that allows the bubble tube measuring portion 1 provided to the mounting base 2 to be viewed from the window hole 4 of the container case 3) of the container case 3, the mounting base 2 in which the bubble tube measuring device 15 is fitted and assembled into the inset concavity 16 of the mounting member 13 is disposed in the container case 3, one protruding end portion 2a of the mounting base 2 disposed in the container case 3 is aligned to the window hole 4 of the container case 3, and a screwdriver is inserted from the end portion opening 3a of the container case 3 to tighten and threadably move a single tightening screw 7 provided to the mounting base 2 in a very simple operation.

It is therefore apparent that in the present example the mounting base 2 can be pressingly fixed in the container case 3 in a reliable manner with a simple operation, the mounting base 2 can be pressingly fixed in a positioned state in a prescribed position inside the container case 3 in simple manner without the need for laborious operation, and the mounting base 2 can therefore be positioned and fixed in a prescribed position inside the container case 3 in a simple manner with good precision. Also, a configuration that is very easy to use and assemble can be achieved with few components in a simple configuration composed of a bubble tube measuring device 15; a mounting member 13 composed of a first unit 2A and second unit 2B, both of which are integrally molded from resin; and a single tightening screw 7. Therefore, a novel level that is easily mass produced, has very high commercial value, and that is very practical can be obtained without concern of higher costs.

Figure 9:
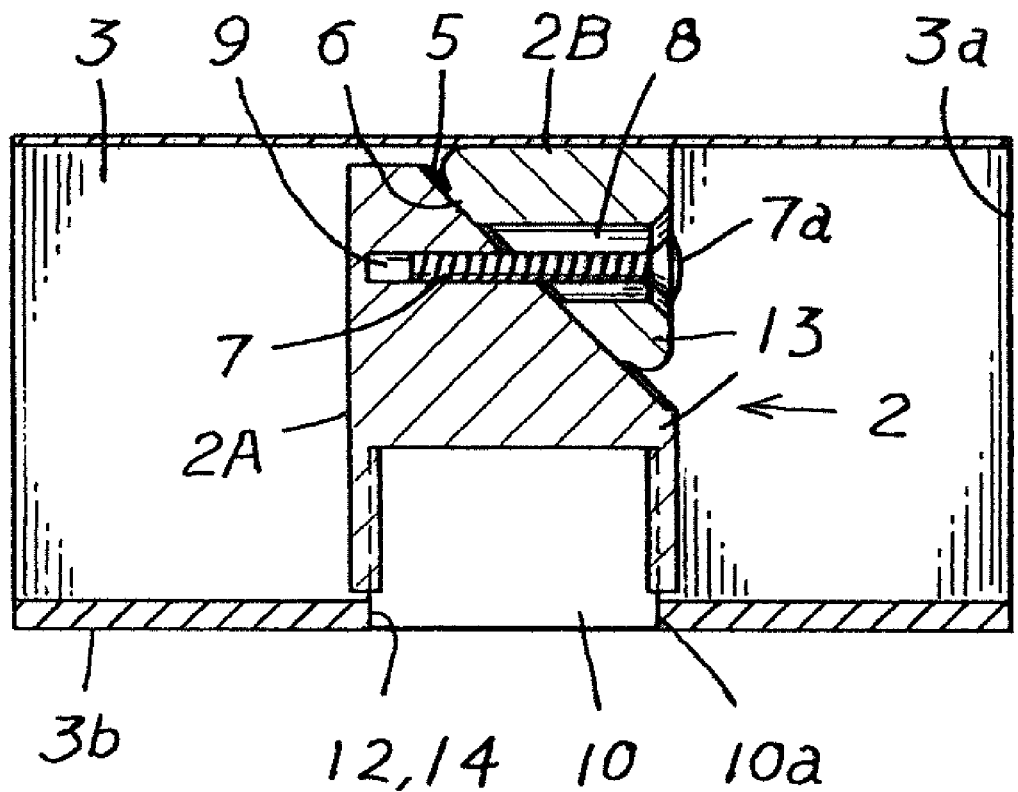
FIG. 9 is another example of the level according to the present example.

In the present example, a bubble tube measuring portion 1 is provided to the mounting base 2, and the mounting base 2 is pressingly fixed in a prescribed position in which the bubble tube measuring portion 1 can be viewed from the window hole 4 disposed in the container case 3, whereby a configuration is provided in which the bubble tube measuring portion 1 is provided to the container case 3. However, a configuration is also possible in which, for example, a magnetic body 10 rather than a bubble tube measuring portion 1 is provided to the mounting base 2, and the mounting base 2 in which the magnetic body 10 is provided is pressingly fixed inside the container case 3, as shown in FIG. 9, whereby the magnetic body 10 is disposed in the container case 3. In this case, the configuration may be one in which the mounting base 2 is pressingly fixed in a prescribed position in which the magnetic body 10 can be exposed from an exposure hole 14 disposed in the container case 3, as shown in FIG. 9. The mounting base 2 is composed of a magnetic body 10 (e.g., a metal plate to which a permanent magnet 10a has been attached) that has a magnet 10a containing and is mounted on a mounting member 13 composed of a first unit 2A and a second unit 2B; the lower portion of the magnetic body 10 mounted on the first unit 2A of the mounting member 13 is used as one end portion 2a of the mounting base 2, as shown in FIG. 9; the upper portion of the second unit 2B of the mounting member 13 is used as the other end portion 2a of the mounting base 2; and the tightening screw 7 provided to the mounting base 2 is tightened to pressingly fix the opposing end portion 2a of the mounting base 2 into the container case 3 in a state in which the lower surface of the magnetic body 10 in a somewhat protruding state (e.g., configured so that the metal plate attached to the permanent magnet 10a somewhat protrudes from the lower surface of the 10) is locked and stopped in the exposure hole 14 that acts as the notch portion 12 provided to the reference surface 3b of the container case 3. The magnetic body 10 is thereby precisely exposed from the exposure hole 14, and the mounting base 2 is configured to be pressingly fixed in a positioned state in a prescribed position of the container case 3 so as to be substantially flush with the reference surface 3b of the container case 3. In such a case, an excellent level is obtained in which the magnetic body 10 can be provided flush against the reference surface 3b of the container case 3 in a simple manner.

The present invention is not limited to the present example, and specific configurations of the constituent elements can be suitably designed.

The invention claimed is:

1. A level composed of a mounting base provided with a bubble tube measuring portion in which a liquid and a bubble are sealed, or a mounting base provided with a magnetic body is disposed inside a container case, and an opposing end portion of the mounting base is pressed to the inner surface of the container case to cause the mounting base to be pressingly fixed inside the container case in a prescribed position that allows said bubble tube measuring portion to be viewed from a window hole provided to the container case, or in a prescribed location that allows said magnetic body to be exposed from an exposure hole provided to the container case; wherein:

said mounting base is configured so that a first unit that presses against the inner surface of one side of the container case and a second unit that presses against the inner surface of the opposing opposite side of the container case are slidably assembled by way of a slide mechanism;

said slide mechanism is formed so that assembly contact surfaces of said first unit and second unit are formed as slope guide surfaces;

the slope guide surfaces make contact with each other, the second unit is slidably configured in the slope direction with respect to the first unit, and the entire length of the mounting base composed of said first unit and second unit is variably configured; and the entire length of the mounting base performs a micromotion when the second unit performs a sliding micromotion in relation to the first unit via pressing means that presses the second unit against the first unit of the mounting base to obtain a structure in which the mounting base can be pressingly fixed inside the container case.

2. The level according to claim 1, wherein said pressing means is configured to press the second unit against the first unit of said mounting base by the tightening and pressing of a tightening member, and to cause the second unit to perform a sliding micromotion against said first unit in the slope direction.

3. The level according to claim 2, wherein
said pressing means has a tightening screw as said tightening member;
the tightening screw is provided in an inserted state in a unit selected from the first unit and the second unit of said mounting base and is provided in a threaded state in the other unit;
the first unit or the second unit in which said tightening screw is provided in an inserted state is configured to perform a sliding micromotion in the slope direction against the tightening screw and the second unit or the first unit in which the tightening screw is provided in a threaded state; and
a configuration is provided in which the tightening screw is tightened and threadably moved, whereby the screw head of the tightening screw presses the second unit against the first unit, and the second unit is caused to perform a sliding micromotion in the slope direction against said first unit.

4. The level according to claim 3, wherein
a threaded hole is provided that allows said tightening screw to be threaded into the slope guide surface of the first unit or the slope guide surface of the second unit of said mounting base;
a screw through-hole that allows the tightening screw threaded into the threaded hole to be inserted is provided to the slope guide surface of the second unit or to the slope guide surface of the first unit; and
the screw through-hole is formed in the shape of a long hole in the lengthwise direction of said mounting base.

5. The level according to claim 3 or 4, wherein
said mounting base is configured to be inserted from the end portion opening of said container case and disposed in the container case; and
said tightening screw is configured to be disposed in said mounting base along an insertion direction into the container case of the mounting base.

6. The level according to any of claims 1 through 4, wherein
a configuration is provided in which the container case has a positioning stopper whereby the mounting base disposed in said container case is positioned and stopped in a prescribed location; and
the opposing end portion of said mounting base is pressed to the inner surface of the container case in a stopped state at the positioning stopper, whereby the mounting base is pressingly fixed in a positioned and stopped state inside the container case.

7. The level according to claim 5, wherein
a configuration is provided in which the container case has a positioning stopper whereby the mounting base disposed in said container case is positioned and stopped in a prescribed location; and
the opposing end portion of said mounting base is pressed to the inner surface of the container case in a stopped state at the positioning stopper, whereby the mounting base is pressingly fixed in a positioned and stopped state inside the container case.

8. The level according to claim 6, wherein
a configuration is provided in which said positioning stopper is used as a notch portion formed in said container case; and
an end portion of said mounting base is formed in a somewhat protruding state to allow the opposing end portion of said mounting base to be pressed to the inner surface of the container case in a state in which the end portion of the mounting base is locked and stopped in said notch portion, whereby the mounting base is pressingly fixed in a positioned and stopped state inside the container case.

* * * * *